Sept. 12, 1961  D. E. SHARP  2,999,337
APPARATUS AND METHOD FOR MAKING MULTIPLE SHEET GLAZING UNITS
Filed Feb. 2, 1956  2 Sheets-Sheet 1

INVENTOR.
Donald E. Sharp
BY
Nobbe & Swope
ATTORNEYS

Sept. 12, 1961 D. E. SHARP 2,999,337
APPARATUS AND METHOD FOR MAKING MULTIPLE SHEET GLAZING UNITS
Filed Feb. 2, 1956 2 Sheets-Sheet 2

INVENTOR.
Donald E. Sharp
BY
Nobbe & Swope
ATTORNEYS

United States Patent Office 2,999,337
Patented Sept. 12, 1961

2,999,337
APPARATUS AND METHOD FOR MAKING
MULTIPLE SHEET GLAZING UNITS
Donald E. Sharp, Maumee, Ohio, assignor to Libbey-
Owens-Ford Glass Company, Toledo, Ohio, a corporation of Ohio
Filed Feb. 2, 1956, Ser. No. 563,007
2 Claims. (Cl. 49—1)

This invention relates to glazing units and more particularly to improved multiple all-glass sheet glazing units and method and apparatus for fabricating such units.

Multiple sheet glazing units may be described generally as comprising two or more sheets of glass which are sealed entirely around their edge portions in spaced relation to provide a hermetically sealed air space therebetween. Due principally to their insulating and condensation preventing qualities, such units have become well established in the building trades and have found wide usage as windows for buildings, show cases, vehicles, refrigerators, and the like.

In installing all-glass multiple sheet glazing units, it is desirable to secure the units such that a minimum area of the units is covered by the glazing putty and attaching hardware while at the same time obtaining maximum strength and rigidity in the installation.

It is therefore an important object of this invention to provide all-glass multiple sheet glazing units which may be easily and securely installed while covering a minimum area of the unit.

A further object of the invention is to provide multiple sheet glazing units having side wall or edge portions to which glazing materials and installation hardware can tightly adhere.

Another object of the invention is to provide a novel method of forming multiple sheet glazing units with a side wall or edge portions which are of a roughened pattern.

A still further object of the invention is to provide novel apparatus by which multiple sheet glazing units of the above charcter may be produced.

Other objects and advantages of the invention will become more apparent during the course of the following description when taken in connection with the accompanying drawings.

In the drawings, wherein like numerals are used to designate like parts throughout the same:

While the present invention is not necessarily limited to all-glass multiple sheet glazing units formed according to any particular process, it is especially well suited to the formation of such units wherein the glass sheets are initially disposed in a substantially vertical plane while being sealed such as described in copending application Serial No. 464,012, filed October 22, 1954, now abandoned, in the names of Eldwin M. Montgomery, Harry N. Dean, Eugene W. Babcock, and Donald E. Sharp.

Figure 1:
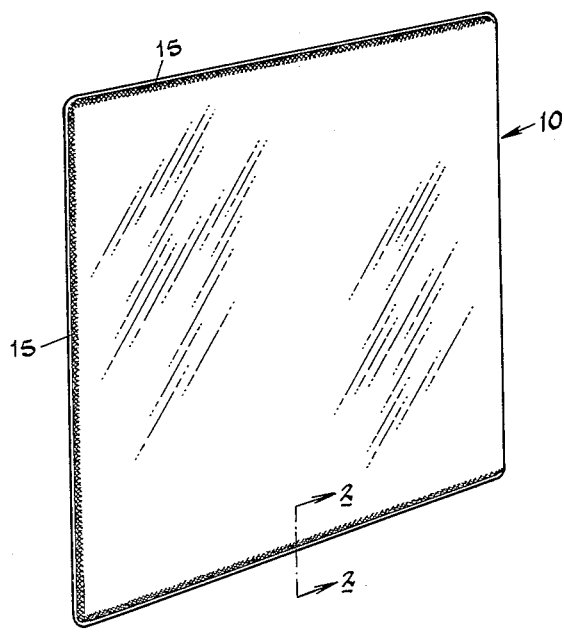
FIG. 1 is a perspective view of an all-glass multiple sheet glazing unit of the type with which this invention is concerned.
Figure 2:
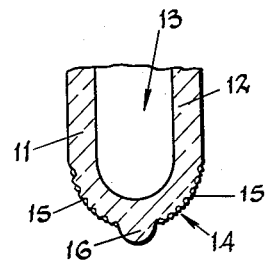
FIG. 2 is a sectional view of the glazing unit taken substantially along lines 2—2 of FIG. 1 showing a sectional view of a side or edge wall of the unit.
Figure 3:
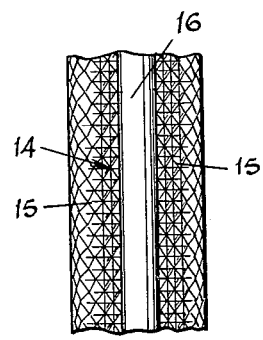
FIG. 3 is a fragmentary view looking toward an edge or side wall of the glazing unit shown in FIG. 1.

With reference now to the drawings, there is shown in FIGS. 1 and 2 an all-glass glazing unit 10 according to the invention which comprises two sheets of glass 11 and 12 spaced from one another as at 13 by side or edge wall portions 14.

The edge wall 14 has a roughened or knurled effect as indicated at 15 which enables glazing material to more firmly adhere to the unit permitting it to be held in a window sash with a minimum area of the unit being obscured. Extending substantially midway along the side or edge wall 14 of the unit is a bead or ridge 16 which acts as an additional anchor in the glazing material and/or hardware when the unit is mounted.

Figure 4:
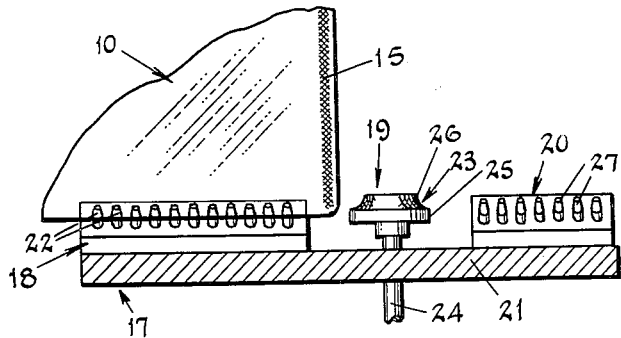
FIG. 4 is a schematic showing of apparatus by means of which the multiple sheet glazing units of the invention are produced.
Figure 5:
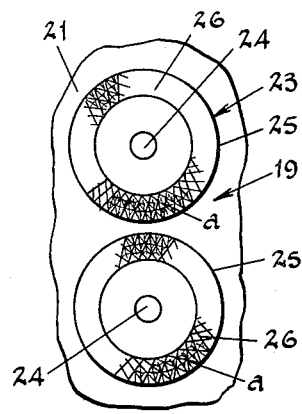
FIG. 5 is a top view of the forming tool of the invention used in shaping the side or edge wall portions of the glazing units.

As will be best seen in FIGS. 4 and 5, the means by which the sheets 11 and 12 of the all-glass glazing unit 10 may be sealed together is designated generally by the numeral 17 and includes a fusion burner 18, a forming or shaping tool 19, and a finishing burner 20 all mounted on a suitable frame 21. More particularly, the fushion burner 18 has angularly disposed nozzles 22 aligned in two rows, between which the sheets are moved. The nozzles 22 serve to direct flames in impinging relation upon the edge portions of the sheets 11 and 12 to heat such portions to a pliable condition.

Figure 7:
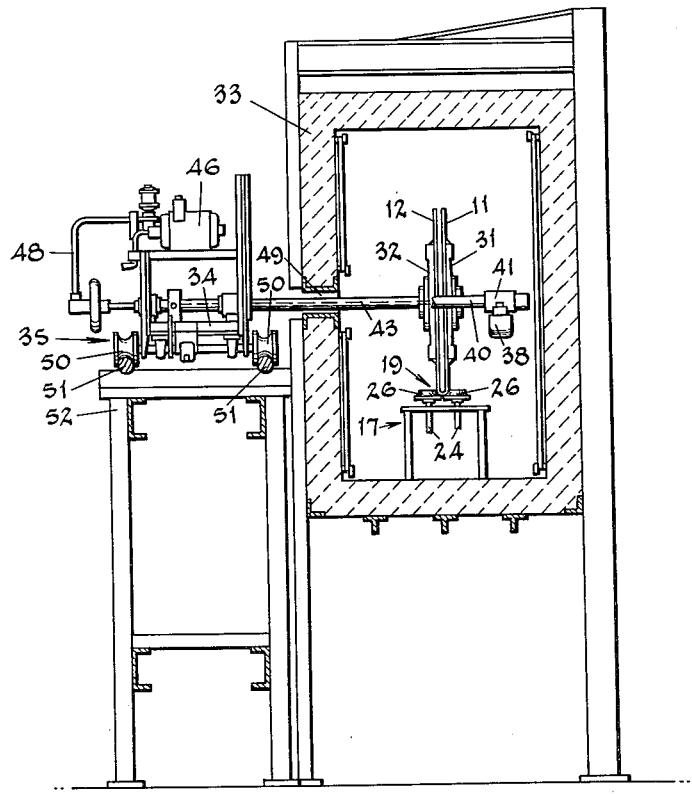
FIG. 7 is a transverse sectional view of an apparatus for supporting the glass sheets to be sealed in spaced, face-to-face relationship and for moving the sheets past the edge forming tools.
Figure 8:
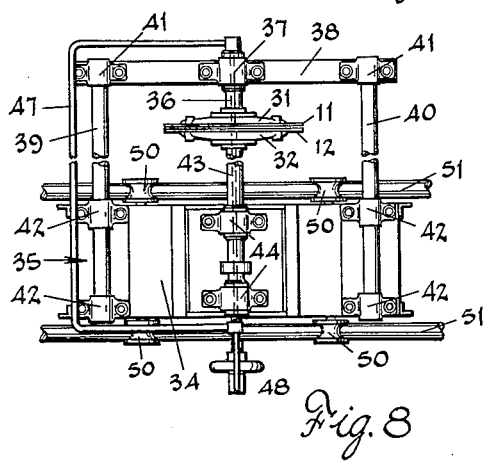
FIG. 8 is a plan view of the apparatus of FIG. 7.

The glass sheets 11 and 12 may be supported in spaced, face-to-face relationship and advanced past the sealing means 17 by an apparatus such as disclosed in the above noted copending application Serial No. 464,012. Thus, as illustrated in FIGS. 7 and 8, this apparatus includes a pair of vacuum platens 31 and 32 operable to grip the outer surfaces of the individual sheets of glass 11 and 12 respectively and to support the same in a substantially vertical position within a furnace 33 in which the sealing means 17 is also located. The platens 31 and 32 are supported on a horizontal platform 34 mounted on a carriage 35 disposed adjacent the furnace.

The vacuum platen 31 is fixed to one end of a hollow stub shaft 36 which is journaled in a bearing 37 secured to a horizontal member 38 intermediate the ends thereof. The member 38 is supported at its opposite ends by a pair of spaced transverse support rods 39 and 40 received at their inner ends in pillow blocks 41 secured to the member 38, the opposite end portions of said support rods being mounted in spaced pillow blocks 42 carried by the carriage 35.

The opposite vacuum platen 32, positioned in spaced relation to the platen 31, is keyed to the adjacent end of the hollow shaft 43 journaled in spaced bearings 44 carried by the platform 34 of carriage 35.

The platens 31 and 32 are coupled to a suitable source of vacuum 46 through pipes 47 and 48 respectively which communicate with the opposed faces of the platens through axial bores formed in each of the shafts 36 and 43.

In order to move the carriage 35 and glass sheets carried thereby past the sealing means 17, the carriage is mounted to travel along a predetermined path extending parallel to the furnace 33. Thus, the support rods 39 and 40 project through an elongated slot 49 in a side wall of the furnace to carry the platens 31 and 32 within the furnace. Grooved rollers 50 are journaled on the carriage 35 to roll along cylindrical tracks 51 mounted on a frame 52 provided along one wall of the furnace 33 to support the carriage 35 adjacent the slot 49.

After a pair of aligned edge portions of the glass sheet are heated they are moved into contact with the forming tool 19. As will best be seen in FIG. 5, the forming tool includes forming wheels 23 rotatably mounted on substantially vertical axles 24.

Each of the wheels 23 preferably has a lower cylindrical ridge portion 25 (FIG. 4) which may be moved substantially in contact with one another, while the upper portions of the forming wheels are tapered upwardly and inwardly from the ridge portion and have a dished-out or concave portion as indicated at 26. This dished-out or concave portion is formed to correspond to the desired curvature or shape of the sealed edge or side wall 14 of the glazing unit 10. As may be seen in FIG. 5, the dished-out or concave portions of the forming wheels are knurled as indicated at a.

Thus as the sheets leave the fusion burner area where the edge portions thereof are heated to a pliable condition, they engage the forming wheels 23 which are free to rotate or may be driven and act to force or bring the edge portions of the respective sheets 11 and 12 into contact with one another as is illustrated in FIG. 2. That is, the softened edge portions of the sheets upon passing through the restricted passageway between the forming wheels are caused to deflect inwardly to a point where they are brought into contact with one another and fused together. Since the edges are soft or pliable as they pass between the forming rolls, the imprint of the dished-out or concave portion is imparted to the side or edge wall 14.

If desired, after the side walls or edges of the all-glass unit have been bent to the desired configuration by the forming tool 19, the sharp portions of knurled areas may be smoothed somewhat by a fire polishing process. For this purpose, there is provided a finishing or polishing burner 20 having two rows of aligned nozzles 27 which impinge upon the sealed edge of the unit to again heat it slightly thus causing the extreme pointed areas to blend to round off to some extent.

Figure 6:
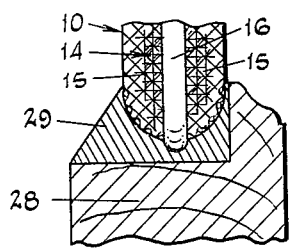
FIG. 6 is a fragmentary sectional view of a multiple sheet glazing unit shown secured in place in a typical installation.

A typical installation of a glazing unit of the invention is shown in FIG. 6 wherein the glazing unit is held in a sash 28 by a glazing material 29. It will be noted that the combination of the knurled portion 15 and the bead ridge 16 enable the unit to be anchored securely to the sash while at the same time obscuring only a very small portion of the face surfaces of the unit.

It is to be understood that the form of the invention disclosed herein is to be taken as the preferred embodiment thereof and that various changes in the shape, size and arrangement of parts may be resorted to without departing from the spirit of the invention or the scope of the following claims.

I claim:

1. In apparatus for producing all-glass multiple sheet glazing units, comprising means for supporting a pair of hard glass sheets in fixed spaced face-to-face relation with respect to one another, a conveyor for moving said spaced glass sheets along a definite path, concentrated heat sources for raising the temperature of the spaced marginal edge portions of said sheets to a condition at which they may be fused to one another, a pair of forming wheels mounted for rotation the peripheral portions of which engage opposed heated marginal edge portions of said sheets as they move along the definite path and urge them toward and into fusion contact with one another, said peripheries provided with a plurality of spaced depressions to provide the sealed edge wall of the glazing unit with a patterned embossed surface.

2. A method of producing all-glass multiple sheet glazing units, comprising supporting a pair of hard glass sheets in fixed spaced face-to-face relation with respect to one another, moving said glass sheets along a definite path, heating the marginal edge portions only of said sheets as they move along said path to a temperature at which they are pliable, urging said pliable marginal edge portions toward and into direct fusion contact with one another to form a sealed edge wall, and during the urging of the pliable marginal edge portions toward one another impressing in the outersurfaces thereof a plurality of spaced depressions to provide a patterned embossed surface on the edge wall.

References Cited in the file of this patent

UNITED STATES PATENTS

| | | |
|---|---|---|
| 1,448,351 | Kirlin | Mar. 13, 1923 |
| 1,836,413 | Trinks et al. | Dec. 31, 1931 |
| 1,841,527 | Fraser | Jan. 19, 1932 |
| 2,116,297 | Aurien | May 3, 1938 |
| 2,150,355 | Biggers | Mar. 14, 1939 |
| 2,182,986 | Hoge et al. | Dec. 12, 1939 |
| 2,193,393 | Danner | Mar. 12, 1940 |
| 2,198,578 | Hazelton et al. | Apr. 23, 1940 |
| 2,237,186 | Malloy | Apr. 1, 1941 |
| 2,398,371 | Gerspacher | Apr. 16, 1946 |
| 2,521,048 | Day | Sept. 5, 1950 |
| 2,624,979 | Clever et al. | Jan. 13, 1953 |
| 2,761,248 | Cowley et al. | Sept. 4, 1956 |
| 2,761,249 | Olson et al. | Sept. 4, 1956 |